(12) United States Patent
Punzalan et al.

(10) Patent No.: US 11,093,899 B2
(45) Date of Patent: Aug. 17, 2021

(54) AUGMENTED REALITY DOCUMENT PROCESSING SYSTEM AND METHOD

(71) Applicant: ADP, LLC, Roseland, NJ (US)

(72) Inventors: Roel Punzalan, Pasadena, CA (US); Nacho Andrade, Pasadena, CA (US)

(73) Assignee: ADP, LLC, Roseland, NJ (US)

( * ) Notice: Subject to any disclaimer, the term of this patent is extended or adjusted under 35 U.S.C. 154(b) by 383 days.

(21) Appl. No.: 15/951,675

(22) Filed: Apr. 12, 2018

(65) Prior Publication Data

US 2019/0318313 A1 Oct. 17, 2019

(51) Int. Cl.
| | |
|---|---|
| *G06Q 10/00* | (2012.01) |
| *G06Q 10/10* | (2012.01) |
| *G06K 9/00* | (2006.01) |
| *G06F 16/93* | (2019.01) |
| *G06F 16/23* | (2019.01) |

(52) U.S. Cl.
CPC ....... *G06Q 10/105* (2013.01); *G06F 16/2379* (2019.01); *G06F 16/93* (2019.01); *G06K 9/00469* (2013.01); *G06K 9/00671* (2013.01); *G06K 2209/01* (2013.01)

(58) Field of Classification Search
CPC ... G06Q 10/105; G06F 16/93; G06F 16/2379; G06K 9/00469; G06K 9/00671; G06K 2209/01; G06K 9/00442
See application file for complete search history.

(56) References Cited

U.S. PATENT DOCUMENTS

| | | | |
|---|---|---|---|
| 7,229,013 B2 * | 6/2007 | Ben-Aissa | G06K 9/00087 235/380 |
| 9,064,285 B1 * | 6/2015 | Nathoo | G06Q 10/1053 |
| 9,767,585 B1 * | 9/2017 | Carter, Jr. | G06T 11/60 |
| 10,229,100 B1 * | 3/2019 | Lesner | G06F 40/174 |
| 2009/0285444 A1 | 11/2009 | Erol et al. | |
| 2010/0331043 A1 | 12/2010 | Chapman et al. | |

(Continued)

OTHER PUBLICATIONS

Tutorialspoint (Archived by the WayBackMachine at https://www.tutorialspoint.com/sql/sql-update-query.htm on Oct. 28, 2016;).*

(Continued)

*Primary Examiner* — Gabrielle A McCormick
(74) *Attorney, Agent, or Firm* — Yee & Associates, P.C.

(57) ABSTRACT

A method, apparatus, system, and computer program product for processing a document. A computer system identifies the document in a live view on a mobile display system for processing; performs optical character recognition on the document identified in the live view of the document on the mobile display system for a user to form document information for the document; and identifies human resources information relating to the document information using the document information and a policy. The human resources information is stored in a database, and the policy defines the human resources information relevant to the document. The computer system also displays a relation of the human resources information to the document information in augmented reality information on the live view of the document on the mobile display system and updates the human resources information in the database using the document information to form updated human resources information.

48 Claims, 10 Drawing Sheets

(56) References Cited

U.S. PATENT DOCUMENTS

| | | | |
|---|---|---|---|
| 2013/0260727 A1 | 10/2013 | Knudson et al. | |
| 2014/0111542 A1* | 4/2014 | Wan | G06K 9/3258 |
| | | | 345/633 |
| 2014/0281903 A1 | 9/2014 | Le Chevalier et al. | |
| 2015/0254902 A1* | 9/2015 | Macia | G06Q 30/02 |
| | | | 345/633 |
| 2015/0339453 A1* | 11/2015 | Richards | G16H 80/00 |
| | | | 345/633 |
| 2016/0049010 A1* | 2/2016 | Hinski | G06T 19/006 |
| | | | 345/633 |
| 2018/0150810 A1* | 5/2018 | Lee | G06T 11/60 |
| 2018/0159838 A1* | 6/2018 | Dintenfass | H04W 12/06 |

OTHER PUBLICATIONS

Lukosch, S., Billinghurst, M., Alem, L. et al. Collaboration in Augmented Reality. Comput Supported Coop Work 24, 515-525 (2015). https://doi.org/10.1007/s 10606-015-9239-0.*

A. W. Ismail and M. S. Sunar, "Collaborative Augmented Reality Approach for Multi-user Interaction in Urban Simulation," 2009 International Conference on Information and Multimedia Technology, Jeju Island, 2009, pp. 19-23, doi: 10.1109/ICIMT.2009.68.*

J. J. Hull et al., "Paper-Based Augmented Reality," 17th International Conference on Artificial Reality and Telexistence (ICAT 2007), Esbjerg, Denmark, 2007, pp. 205-209, doi: 10.1109/ICAT.2007.49.*

Hull et al., "Paper-Based Augmented Reality," 17th International Conference on Artificial Reality and Telexistence, 2017, pp. 205-209.

\* cited by examiner

AUGMENTED REALITY DOCUMENT PROCESSING SYSTEM AND METHOD

BACKGROUND INFORMATION

1. Field

The present disclosure relates generally to managing documents and, in particular, to a method, an apparatus, a system, and a computer program product for processing documents using an augmented reality system.

2. Background

An organization often receives notices from various government agencies. For example, the organization may receive documents in the form of a garnishment notice, a state income tax rate change notice, an unemployment claim notification, and other types of notices from local, state, and federal government agencies. When the organization uses a human resources management company to manage compliance with these notices, the organization sends the documents for these notices to the human resources management company.

Further, the organization also may receive other types of documents that require processing by the human resources management company. These other documents may include, for example, a form W-4, a benefits request, an employee name change, an employment verification request, a vacation request, and other similar types of documents that require processing by a human resources management company.

Currently, an employee in the organization scans the documents and sends the documents to the organization by email; sends the documents by facsimile; or logs onto a website for the human resources management company and uploads the scanned document. Additionally, the employee may also include notes to the scan or facsimile of the document. The documents uploaded and other information sent are reviewed by employees at the human resources management company. As part of this review, a request for a rescan of a document, a request for additional documents, or a request for other information may be made by the human resources management company. This request may be sent back in an email or through the website. A response is sent by the organization. More requests and responses may be exchanged as part of this process.

This submission process for documents is a timely process and can be error-prone. The time increases as the number of documents received for submission to the human resources management company increases. In some organizations, hundreds of documents of different types from different sources may take much more time than desired.

Therefore, it would be desirable to have a method and apparatus that take into account at least some of the issues discussed above, as well as other possible issues. For example, it would be desirable to have a method and apparatus that overcome a technical problem with the time and expense involved with submitting documents to a human resources management company for processing.

SUMMARY

An embodiment of the present disclosure provides a method for processing a document. A computer system identifies the document in a live view on a mobile display system for processing. The computer system; performs optical character recognition on the document identified in the live view of the document on the mobile display system for a user to form document information for the document; and identifies human resources information relating to the document information using the document information and a policy. The human resources information is stored in a database, and the policy defines the human resources information relevant to the document. The computer system also displays a relation of the human resources information to the document information in augmented reality information on the live view of the document on the mobile display system and updates the human resources information in the database using the document information to form updated human resources information.

Another embodiment of the present disclosure provides a method for processing a document. A computer system identifies the document in a live view on a mobile display system for processing; performs optical character recognition on the document identified in the live view of the document on the mobile display system for a user to form document information for the document; and identifies a parameter in human resources information for the document information using the document information and a policy. The human resources information is stored in a database, wherein the human resources information is used in a number of human resource operations, the policy defines the human resources information relevant to the document. The computer system displays a relation of the human resources information to the document information in augmented reality information on the live view of the document on the mobile display system.

Yet another embodiment of the present disclosure provides a document processing system comprising a computer system and a document running on the computer system. The document processor identifies a document in a live view on a mobile display system for processing; performs optical character recognition on the document identified in the live view of the document on the mobile display system for a user from document information for the document; identifies human resources information relating to the document information using the document information and a policy. The human resources information is stored in a database, and the policy defines the human resources information relevant to the document. The document processor displays a relation of the human resources information to the document information as augmented reality information on the live view of the document on the mobile display system and updates the human resources information in the database using the document information to form updated human resources information.

Another embodiment of the present disclosure provides a document processing system comprising a computer system and a document processor running on the computer system. The document processor identifies a document in a live view on a mobile display system for processing; performs optical character recognition on the document identified in the live view of the document on the mobile display system for a user to form document information for the document; and identifies a parameter in human resources information for the document information using the document information and a policy. The human resources information is stored in a database and the human resources information is used in a number of human resource operations. The policy defines the human resources information relevant to the document. The document processor displays a relation of the human resources information to the document information as augmented reality information on the live view of the document.

Yet another embodiment of the present disclosure provides a computer program product for document processing comprised of a computer readable storage media; first program code, stored on the computer readable storage media, for identifying a document in a live view on a mobile display system for processing; second program code, stored on the computer readable storage media, for performing optical character recognition on the document identified in the live view of the document on the mobile display system for a user to form document information for the document; third program code, stored on the computer readable storage media, for identifying human resources information relating to the document information using the document information and a policy, wherein the human resources information is stored in a database, and wherein the policy defines the human resources information relevant to the document; fourth program code, stored on the computer readable storage media, for displaying a relation of the human resources information to the document information as augmented reality information on the live view of the document on the mobile display system; and fifth program code, stored on the computer readable storage media, for updating the human resources information in the database using the document information to form updated human resources information.

Another embodiment of the present disclosure provides a computer program product for document processing comprising a computer readable storage media; first program code, stored on the computer readable storage media, for identifying a document in a live view on a mobile display system for processing; second program code, stored on the computer readable storage media, for performing optical character recognition on the document identified in the live view of the document on the mobile display system for a user to form document information for the document; third program code, stored on the computer readable storage media, for identifying a parameter in the human resources information for the document information using the document information and a policy, wherein the human resources information is stored in a database, wherein the human resources information is used in a number of human resource operations, and wherein the policy defines the human resources information relevant to the document; and fourth program code, stored on the computer readable storage media, for displaying a relation of the human resources information to the document information as augmented reality information on the live view of the document.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that it would be desirable to have a method, an apparatus, a system, and a computer program product that processes documents in a manner that reduces time needed to process these documents. The illustrative embodiments also recognize and take into account that having employees process submission of the documents can result in errors during processing of the documents. The illustrative embodiments recognize and take into account that implementing a process that removes human error in the processing of the documents is desirable.

Thus, the illustrative embodiments provide a method, an apparatus, a system, and a computer program product for document processing. A computer system identifies a document in a live view on a mobile display system for processing. The document contains changes that may affect human resources information managed by a service provider through a service. Based on analyzing the document, the human resources information may need to be changed to maintain accuracy of the human resources information. The computer system performs optical character recognition on the document identified in the live view of the document on the mobile display system for a human operator to form document information for the document. The computer system identifies the human resources information relating to the document information using the document information and a policy. The human resources information is stored in a database system, wherein the policy defines the human resources information relevant to the document. The computer system displays a relation of the human resources information to the document information in augmented reality information on the live view of the document on the mobile display system to augment the live view. The computer system updates the human resources information in the database system using the document information to form updated human resources information.

Figure 1:
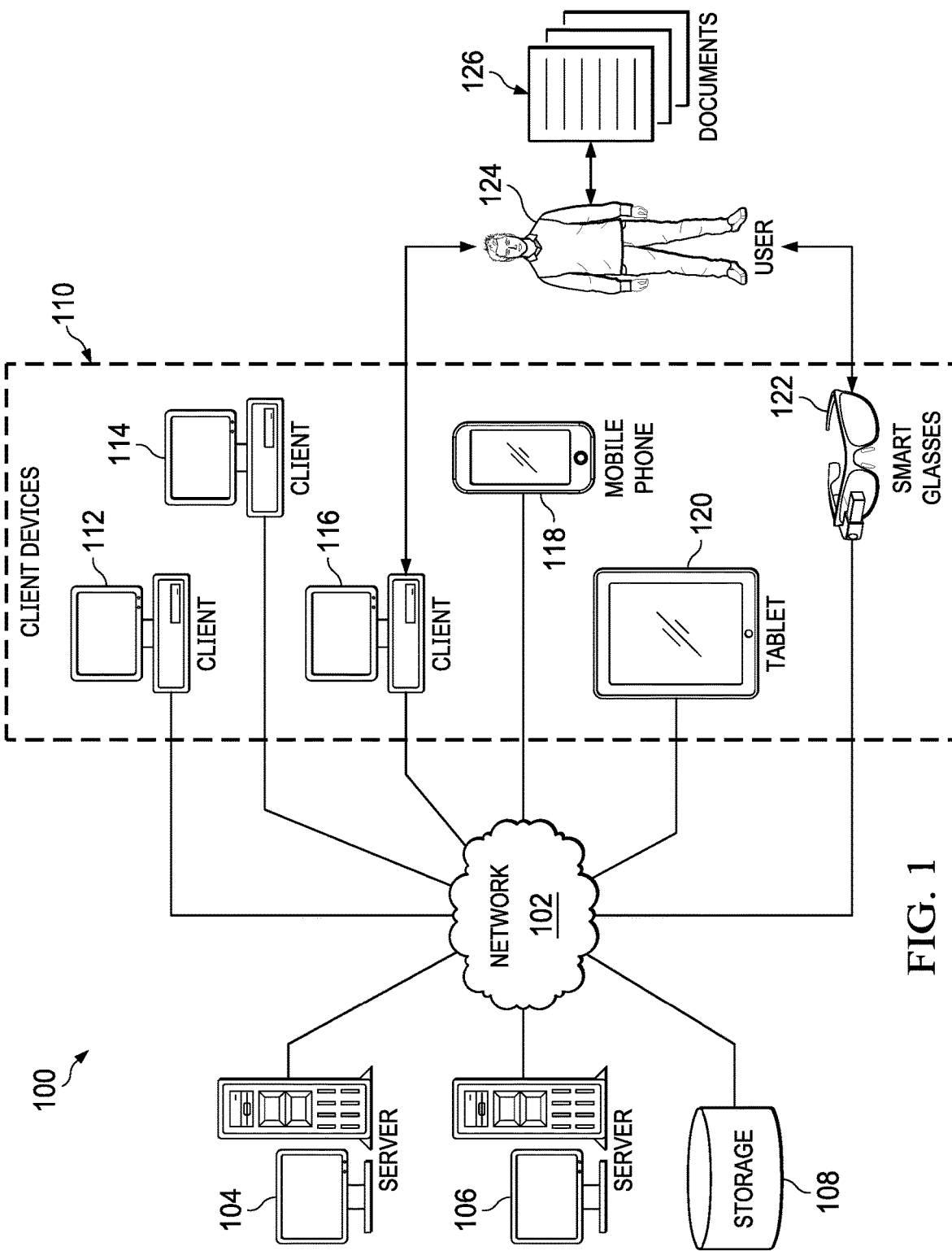
FIG. 1 is a pictorial representation of a network of data processing systems in which illustrative embodiments may be implemented.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 may be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, some or all of client devices 110 may form an Internet of things (IOT) in which these physical devices can connect and exchange data.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 may be stored on a computer recordable storage medium and downloaded to a data processing system or other device for use. For example, program code may be stored on a computer recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 may be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of," when used with reference to items, means one or more items. For example, "a number of different types of networks" is one or more different types of networks.

Further, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

In the illustrative example, user 124 operates a mobile display system, such as smart glasses 122, to process documents for submission to a service for a human resources service running on a computer such as server computer 104. User 124 processes documents 126 using an augmented reality system through smart glasses 122.

Figure 2:
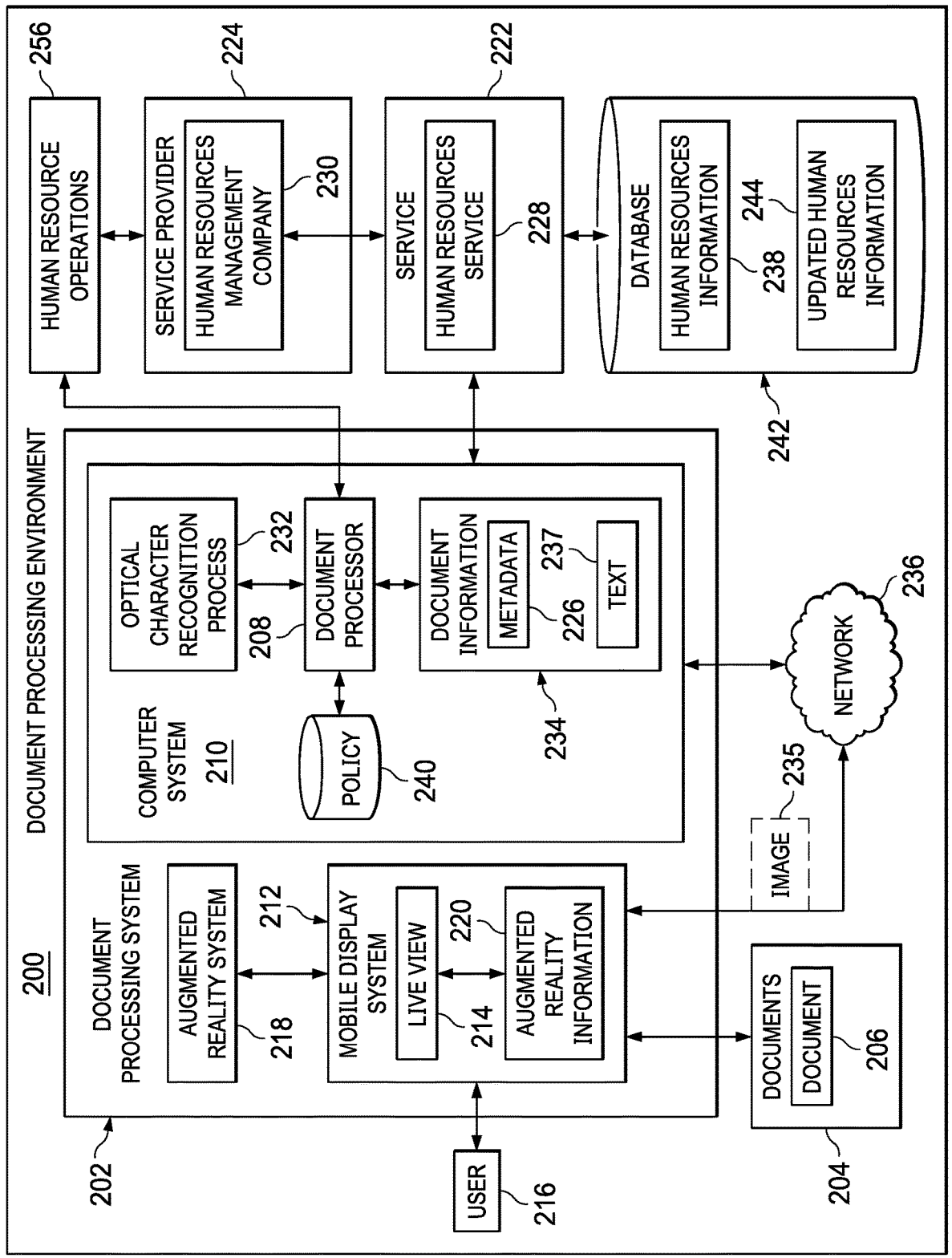
FIG. 2 is a block diagram of a document processing environment in accordance with an illustrative embodiment.

With reference next to FIG. 2, a block diagram of a document processing environment is depicted in accordance with an illustrative embodiment. In this example, document processing environment 200 includes document processing system 202 which operates to process documents 204. Document 206 in documents 204 is selected from a group of document types comprising an agency notice, a tax rate change notice, a state tax rate change notice, a sales tax rate change notice, a state income tax rate change notice, a wage and garnishment letter, a power of attorney, a third-party administrator form, a reporting agent form, a benefits request, an employee name change request, an employment verification request, a vacation request, a tax credit identification form, an employment application, an employment eligibility form, and other suitable types of documents.

As used herein, "a group of," when used with reference to items means one or more items. For example, "a group of document types" is one or more document types.

In this illustrative example, document processing system 202 includes a number of different components. As depicted, document processing system 202 includes document processor 208 running on computer system 210 and mobile display system 212.

Document processor 208 can be implemented in software, hardware, firmware, or a combination thereof. When software is used, the operations performed by document processor 208 may be implemented in program code configured to run on hardware, such as a processor unit. When firmware is used, the operations performed by document processor 208 may be implemented in program code and data and stored in persistent memory to run on a processor unit. When hardware is employed, the hardware may include circuits that operate to perform the operations in document processor 208.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

Computer system 210 is a physical hardware system and includes one or more data processing systems. When more than one data processing system is present, those data processing systems are in communication with each other using a communications medium. The communications medium may be a network. The data processing systems may be selected from at least one of a computer, a server computer, a tablet, or some other suitable data processing system.

As depicted, mobile display system 212 is a hardware system and is configured to display live view 214 to user 216. User 216 is a human operator in these illustrative examples.

In this illustrative example, mobile display system 212 can function as augmented reality system 218 and display augmented reality information 220 on live view 214. In this illustrative example, mobile display system 212 is selected from one of a head-mounted display, a mobile phone, a tablet computer, smart glasses, wearable computer glasses, or some other suitable display system that can be moved and held or worn by user 216.

During operation, these components process documents 204. The processing of documents 204 includes at least one of sending metadata 226 about documents 204, submitting documents 204, sending document information derived from documents 204, or other actions with respect to documents 204 to service 222 for service provider 224. As depicted, service 222 can be human resources service 228 provided by service provider 224 in the form of human resources management company 230.

Service 222 can also be selected from one of a payroll service, a compliance service, a tax compliance service, a benefits service, and a retirement planning service. Human resources service 228 can include a number of different functions including at least one of payroll, benefits management, retirement, recruitment, training and development of employees, and other suitable functions relating to human resources. Human resources service 228 also can include compliance service.

Compliance service are performed to comply with rules, regulations, notifications, and other items from a governmental authority, consortium, a regulatory agency, or some other source of rules or regulations. The governmental authority is selected from at least one of a local agency, a state agency, a federal agency, a state court, a federal court, a state legislative body, and a federal legislative body.

In this illustrative example, document 206 is a notice that may affect human resources information 238. Human resources information 238 includes information used by human resources service 228. In other words, document 206 may change the accuracy of human resources information 238 requiring changes to human resources information 238. For example, document 206 may change a tax rate, exemptions, benefits, employee information, or other information within human resources information 238.

As depicted, document processor 208 running on computer system 210 identifies document 206 in live view 214 on mobile display system 212 for processing and performs optical character recognition (OCR) using optical character recognition process 232 on document 206 identified in live view 214 of document 206 on mobile display system 212 for user 216 to form document information 234 for document 206. For example, mobile display system 212 can send image 235 over network 236 to document processor 208.

As depicted, document information 234 comprises text 237 derived from performing optical character recognition and may also comprise metadata 226 or other suitable types of information derived from document 206. Metadata 226 may include, for example, a date of document 206, a sender, a recipient, or other suitable information about document 206.

The process identifies human resources information 238 relating to document information 234 using document information 234 and policy 240. As depicted, human resources information 238 is stored in database 242.

In this illustrative example, database 242 is a collection of data. Database 242 may be a relational database containing a collection of schemas, tables, queries, reports, views, and other elements. Database 242 can be accessed by a software application, such as a database management system. Service 222 may include the database management system. In other illustrative examples, other software, such as document processor 208, may directly access database 242.

In the illustrative example, policy 240 defines human resources information 238 that is relevant to document 206. In one illustrative example, policy 240 is a compliance policy, and human resources information 238 is compliance information that is used in human resource operations to meet a number of government compliance regulations. In other words, policy 240 can define what information is needed to find human resources information 238 that corresponds to document information 234.

Further, document processor 208 displays a relation of human resources information 238 in database 242 to document information 234 in augmented reality information 220 on live view 214 of document 206 on mobile display system 212. The relation of human resources information 238 to document information 234 in augmented reality information 220 may take a number of different forms.

For example, the relation may be displayed as a comparison between human resources information 238 and document information 234 using graphical indicators in augmented reality information 220. In another illustrative example, the relation may be displayed by highlighting parts of document 206. The highlighting indicates that a relation is present with human resources information 238. In this depicted example, the highlighting is a less specific way of showing the relation between human resources information 238 and document information 206 as compared to displaying a comparison.

Further, document processor 208 updates human resources information 238 in database 242 using document information 234 to form updated human resources information 244. In the illustrative example, document processor 208 can update human resources information 238 in response to a user input. Alternatively, document processor 208 can update human resources information 238 automatically without the user input.

As depicted, a number of human resource operations 256 can be performed using updated human resources information 244. In this illustrative example, a number of human resource operations 256 can be performed by at least one of document processor 208, service 222, or human resources management company 230. In this example, the number of human resource operations 256 is selected from at least one of withholding federal taxes from a payroll, withholding state taxes from the payroll, updating tax withholdings, garnishing wages, initiating garnishment, withholding funds for a retirement fund, processing payroll, or some other suitable human resource operations.

Additionally, document processor 208 can send image 235 of document 206 generated by mobile display system 212 to service 222 that processes document 206 over network 236. Further, document processor 208 can send metadata 226 for document 206 with image 235 of document 206 to service 222 over network 236.

In one illustrative example, one or more technical solutions are present that overcome a technical problem with the time and expense involved with submitting documents to a human resources management company for processing. As a result, one or more technical solutions may provide a technical effect of at least one of increasing speed, reducing cost, or reducing errors in processing documents.

One illustrative example provides one or more technical solutions in which document processing system 202 reduces the time and expense for processing documents 204. In one illustrative example, one or more technical solutions are present, in which user 216 of mobile display system 212 views one or more of documents 204 in live view 214 on mobile display system 212, and document processor 208 processes documents 204 with respect to service provider 224. In one or more technical solutions, document processor 208 can display augmented reality information 220 to notify user 216 of processing of a document, request a user input from user 216, or some combination thereof.

As a result, computer system 210 operates as a special purpose computer system in which document processor 208 in computer system 210 enables processing of documents 204 more efficiently. In particular, document processor 208 transforms computer system 210 into a special purpose computer system as compared to currently available general computer systems that do not have document processor 208.

Figure 3:
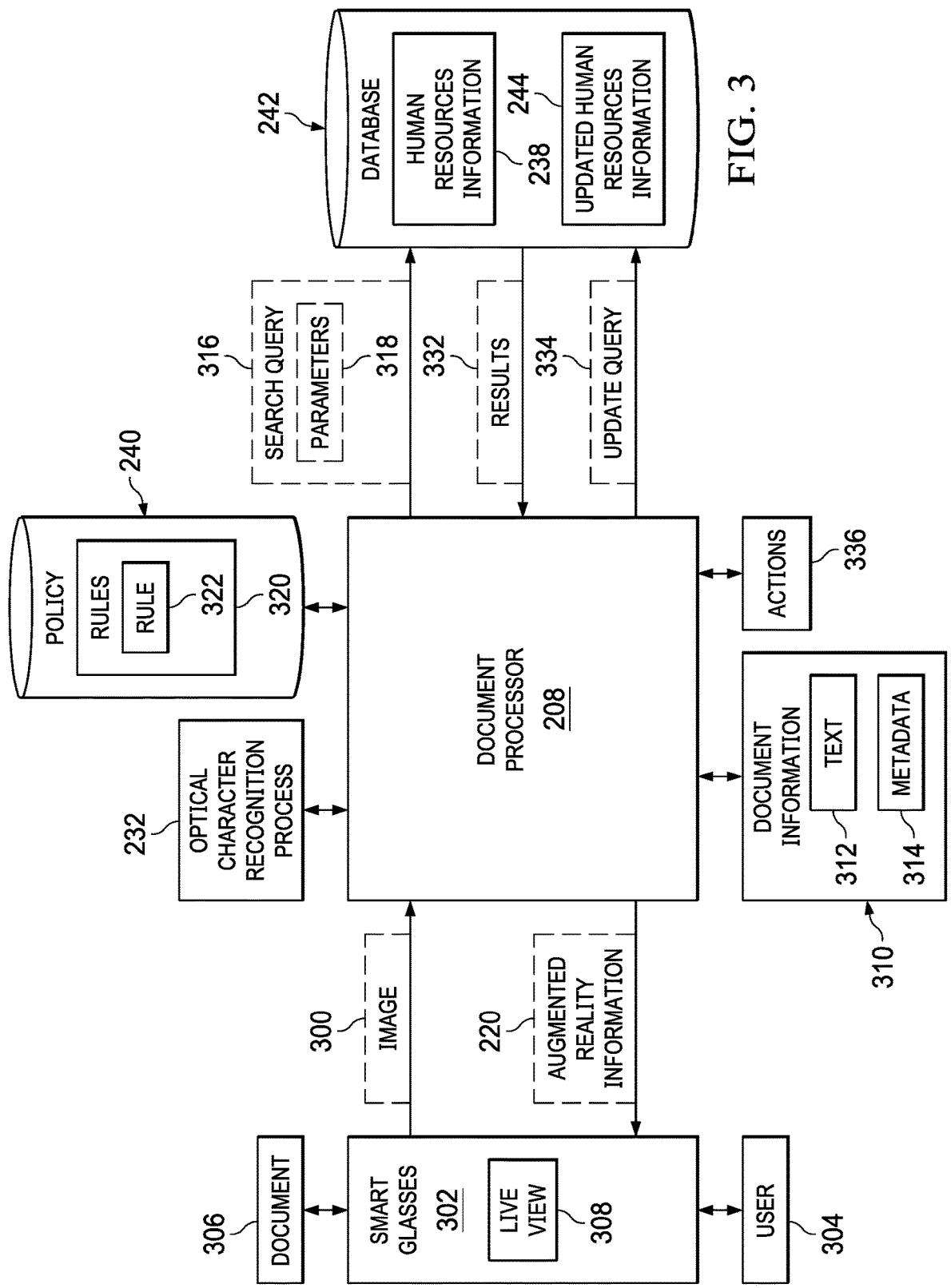
FIG. 3 is a diagram of a data flow for processing a document in accordance with an illustrative embodiment.

With reference now to FIG. 3, a diagram of a data flow for processing a document is depicted in accordance with an illustrative embodiment. In the illustrative examples, the same reference numeral may be used in more than one figure. This reuse of a reference numeral in different figures represents the same element in the different figures.

In this illustrative example, document processor 208 receives image 300 for processing on mobile display system 212 in FIG. 2 in the form of smart glasses 302. Image 300 is generated by user 304 viewing document 306 through live view 308 on smart glasses 302. For example, user 304 may review document 306 in live view 308 of smart glasses 302.

In the illustrative example, document processor 208 can automatically process document 306 as user 304 views document 306 in live view 308 on smart glasses 302. The processing of document 306 by document processor 208 reduces at least one of time or expense in submitting documents to service provider 224 in FIG. 2, such as human resources management company 230 in FIG. 2, for processing.

As depicted, document processor 208 generates document information 310. As depicted, document information 310 includes text 312 and metadata 314. Text 312 can be derived from performing optical character recognition on image 300 using optical character recognition process 232.

Metadata 314 for document 306 can be derived from at least one of image 300, text 312, or other suitable sources. For example, the type of document can be identified from text 312. Text 312 can be processed to identify the document type, date of the document, sender, recipient, and other information about document 306. This information is an example of information that may form metadata 314 in the depicted example. Metadata 314 also can include other information, such as the name of user 304 processing document 306, the location of user 304, or other suitable information.

This information can be derived from user 304 logging into an account or from being in communication with document processor 208. In some illustrative examples, smart glasses 302 may be logged into service 222 in FIG. 2.

Document processor 208 can utilize at least one of image 300 or document information 310 to determine whether service provider 224 in FIG. 2 has already processed document 306. For example, document 306 may be sent to both the organization for which user 304 works for and service provider 224. In some illustrative examples, document 306 may be considered to be already processed if document 306 has been received by service provider 224 prior to user 304 viewing document 306 on live view 308 of smart glasses 302.

In one illustrative example, document processor 208 can send image 300 to service 222 with a request to determine whether document 306 has been received and processed by service provider 224. Service 222 can compare image 300 of document 306 with images of documents processed by service 222 to determine whether document 306 has already been received and processed.

In another example, information identifying document 306 can be obtained from image 300. In this example, optical character recognition process 232 can be a partial or limited processing of image 300. For example, the header or selected portions of document 306 can be processed to identify the type of document, date, sender, receiver, and other information that can be used to determine whether service 222 has already received document 306. In this example, service 222 may perform this determination.

If document 306 has not been processed, document processor 208 sends search query 316 to database 242 based on document information 310 and policy 240. In this example, database 242 may include software for performing queries. Search query 316 is used to search for a match to parameters 318 in search query 316 as defined by rules 320 in policy 240. For example, rules 320 may be applied to document information 310 to generate search query 316. For example, text 312 in document information 310 may contain information indicating that document 306 has a document type that is a form W-4. Document information 310 also may include an employee name, an employee identifier, a number of exemptions, and additional withholdings.

Based on identifying the document type as a form W-4, rule 322 for document type "form W-4" is located in rules 320 in policy 240. In this example, rule 322 specifies that search query 316 should include parameters 318 comprising an employee name, an employee identifier, and a form W-4. Rule 322 may be a query in parameters 318 in which parameters 318 are filled using the employee name and the employer identifier identified from text 312. The value of form W-4 as the document type is identified by document processor 208 based on text 312.

Document processor 208 sends search query 316 based on rule 322. In response to search query 316, results 332 are returned from database 242. In this illustrative example, results 332 contain information from a record from database 242 for the employee that includes a number of exemptions and additional withholding for the employee identified in search query 316.

Document processor 208 compares text 312 with results 332. If the exemptions and the additional withholding identified in text 312 do not match the exemptions and additional withholdings returned for the employee in results 332, then a discrepancy is present. If the number of exemptions match, then document 306 may have already been received and processed by human resources management company 230.

In either case, document processor 208 sends augmented reality information 220 to smart glasses 302 for display on live view 308 to user 304. Augmented reality information 220 augments live view 308 and can take a number of different forms.

For example, augmented reality information 220 can request a user input on how to handle document information 310. In another example, augmented reality information 220 may include a graphical indicator highlighting the employee name and the number of exemptions on document 306 that do not match results 332. Further, augmented reality information 220 also may graphically indicate the current number of exemptions in association with the current exemption seen in live view 308 on document 306. Further, augmented reality information 220 also may prompt user 304 to provide the user input to verify that the change should be made to resolve the discrepancy.

In yet another example, if a discrepancy is not present, augmented reality information 220 may include a graphical indicator to highlight the employee name, exemptions, and additional withholdings with an indication that no changes are to be made. In this case, augmented reality information 220 indicates that document 306 has been received and processed.

In this illustrative example, document processor 208 sends update query 334 when a discrepancy is present. Update query 334 may be based on at least one of image 300, text 312, document information 310, or metadata 314. For example, update query 334 may include at least one of image 300 or a change to the record returned in results 332.

In this example, the update in update query 334 may be made to a parameter in human resources information 238. In this example, the parameter is the number of exemptions for the employee in results 332.

The parameter may take other forms. For example, the parameter may be selected from a group comprising a state tax rate, a federal tax rate, an amount of wages for a garnishment, a name, a social security number, a residence address, a phone number, an amount of pay, an amount of federal tax withholding, a number of exemptions for tax withholding, a marital status, and other suitable parameters that may be changed as needed based on the processing of documents 204 by document processor 208.

In this illustrative example, uploading of image 300, updating of human resources information 238 in database 242, and displaying of human resources information 238 in live view 308 are examples of some of actions 336 that can be performed by document processor 208. Further, with updated human resources information 244, service provider 224 may perform various real-world actions. These actions can be performed by at least one of employees of service provider 224 or processes in service 222. For example, when service provider 224 is human resources management company 230, the actions may include at least one of issuing paychecks, sending reimbursements for expenses, performing performance reviews, planning benefits, implementing benefits, or other suitable actions.

Figure 4:
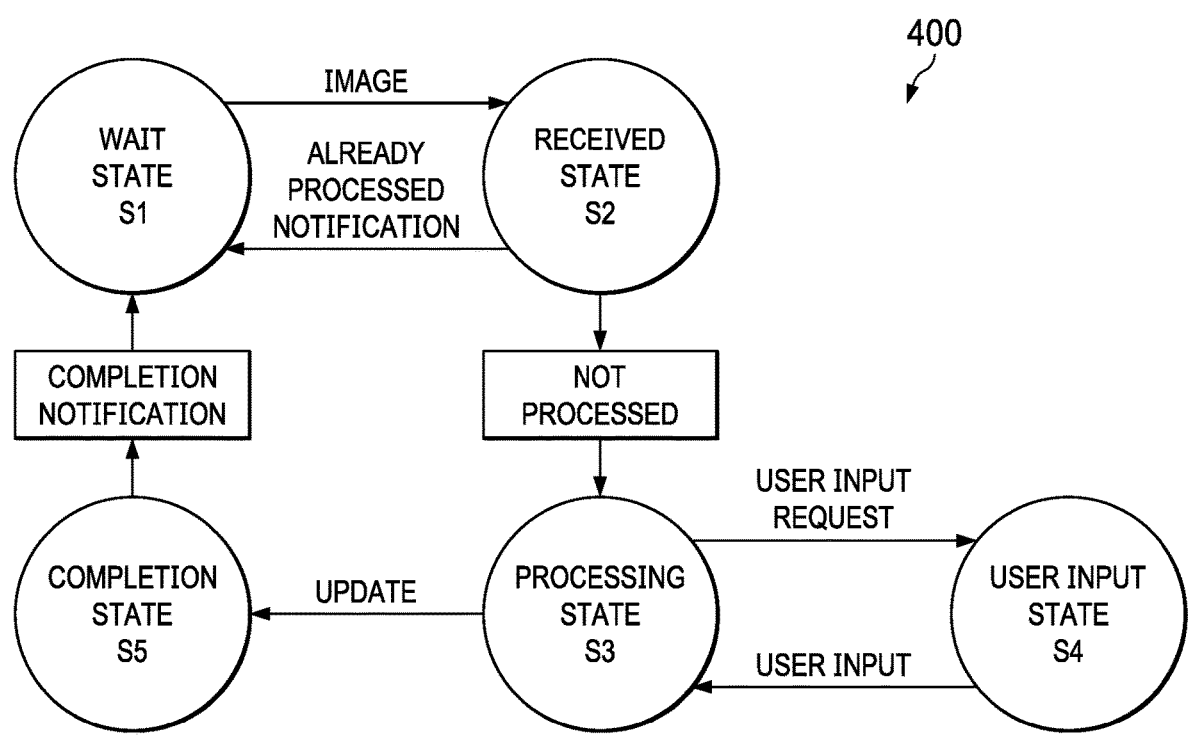
FIG. 4 is a diagram of a state machine for processing documents in accordance with an illustrative embodiment.

Turning to FIG. 4, a state machine for processing documents is depicted in accordance with an illustrative embodiment. In this illustrative example, state machine 400 may be implemented in document processor 208 in FIGS. 2-3 to process documents received from clients to a service. The clients may be organizations selected from at least one of a company, a department in a company, a subsidiary, a government entity, or some other organization that uses a service to process documents to manage human resources information. The service may be internal to the organization or may be used by numerous organizations to process documents to manage human resources information.

The process begins with state machine 400 in Wait State S1. The process shifts to Received State S2 when an image of a document is received from a mobile display system. In this depicted example, the image is generated from a live view in the mobile display system.

In Received State S2, state machine 400 determines whether the document has been processed using the image. If the document has already been processed, state machine 400 sends an already processed notification to the mobile display system and shifts back to Wait State S1. The already processed notification is augmented reality information that is displayed to augment the live view on the mobile display system.

If the document has not been processed, state machine 400 shifts to Processing State S3. In Processing State S3, state machine 400 performs various steps. The steps include generating text from the image of the document using an optical character recognition process in identifying document information using at least one of the text or the image of the document. During processing of the document in Processing State S3, input from the user of the mobile display system may be needed.

In the event that user input is needed, a user input request can be sent to the mobile display system, resulting in state machine 400 shifting to User Input State S4 from Processing State S3. In this illustrative example, the user input request is augmented reality information displayed on a live view on the mobile display system.

When user input is received, state machine 400 shifts back to Processing State S3. When processing of the image of the document is complete, state machine 400 updates the database and shifts to Completion State S5. This update can be made using an update query. The update can include information from at least one of the image, text, or document information.

Thereafter, a completion notification is sent to the mobile display system with the process then shifting to Wait State S1 from Completion State S5 to wait for another image. The completion notification is augmented reality information that is displayed by the mobile display system on the live view. This completion notification is used to let the user know that processing of the document has been completed.

The implementation of state machine 400 in document processor 208 in FIGS. 2-3 provides one or more technical solutions in processing documents. With state machine 400, document processor 208 enables processing of documents viewed by a user through a mobile display system, such as smart glasses or other types of devices.

This processing of documents by document processor 208 can be performed more quickly than currently available techniques for submitting and processing documents. For example, the time and effort of having a user scan each document using an image scanner with a flat bed or document feeder and the user selecting and uploading the documents to a service using a traditional data processing system, such as a desktop computer or work station, is reduced.

Instead, document processor 208 enables generating images of documents and processing those images based on the user focusing on the documents by viewing the documents on a live view on the mobile display system. For example, the documents are imaged and processed while the user reviews the documents. For example, the user may pick up documents from an inbox or open up mail containing the documents. Additional time needed to operate an image scanner and a data processing system is reduced or eliminated using document processor 208 with state machine 400.

Further, user input can be obtained more quickly and easily using document processor 208 with state machine 400. Instead of waiting for an employee from the service to review the document and send requests for more information or clarifications, document processor 208 enables requesting user input as a particular document or documents are being viewed on a live view of the mobile display system. Further, document processor 208 using state machine 400 can also notify the user that processing of the document has been completed through displaying a graphical indicator on the live view of the document on the mobile display system.

The illustration of document processing environment 200 and the different components in FIGS. 2-4 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, one or more users with mobile display systems may be present in addition to or in place of user 216 with mobile display system 212. Further, document processor 208 is shown as a separate functional block from service 222. In other illustrative examples, document processor 208 can be a part of service 222 in other illustrative examples. Also, one or more databases may be present in addition to or in place of database 242. Further, database 242 may be used by another service in addition to or in place of service 222. Additionally, service 222 is run on a computer system, which may be the same or different computer system from computer system 210 in FIG. 2.

Figure 5:
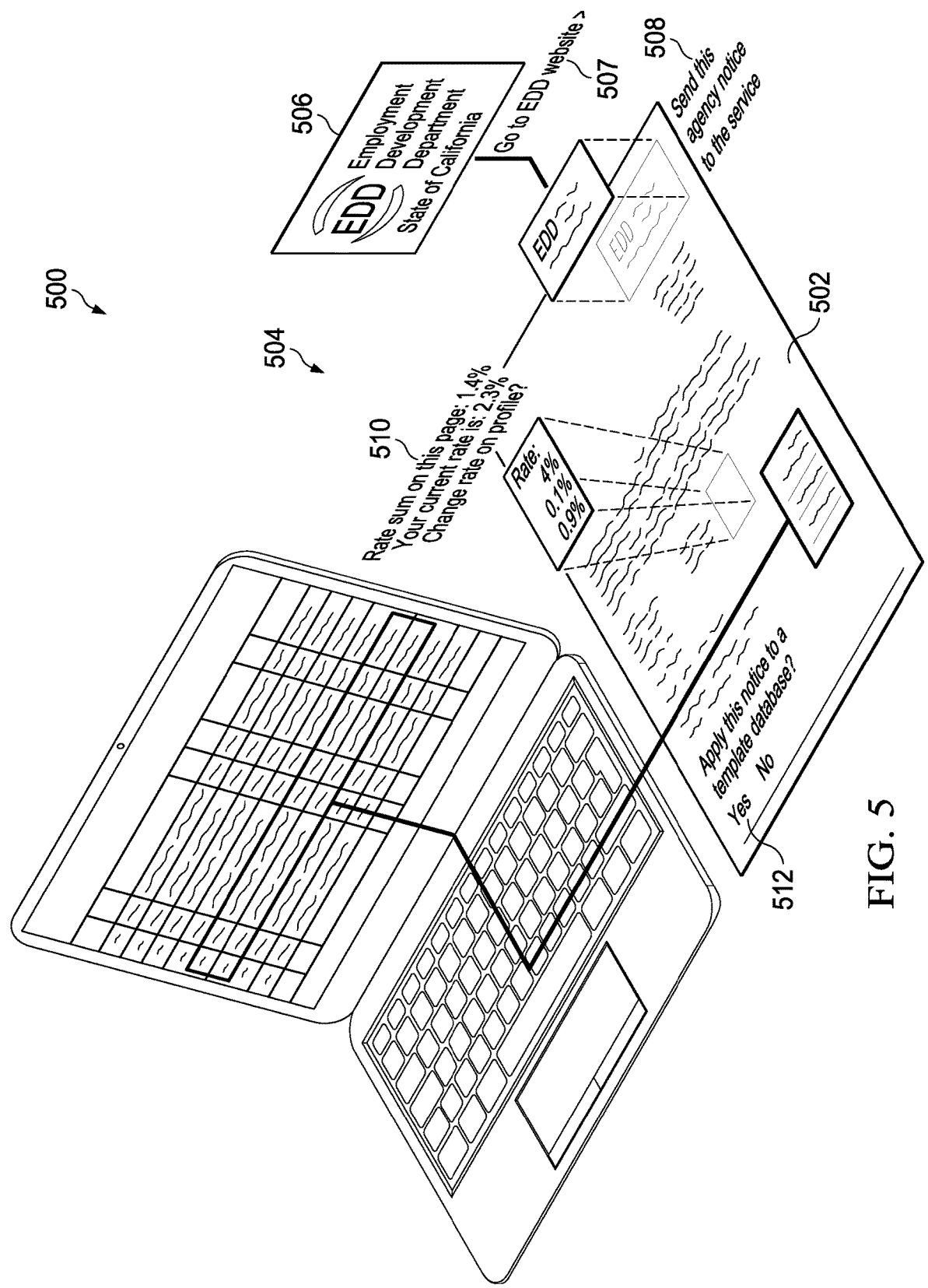
FIG. 5 is an illustration of a live view augmented by augmented reality information in accordance with an illustrative embodiment.

With reference next to FIG. 5, an illustration of a live view augmented by augmented reality information is depicted in accordance with an illustrative embodiment. In this illustrative example, live view 500 is an example of live view 214 in FIG. 2 or live view 308 in FIG. 3.

Document 502 is seen in live view 500 by a user of a mobile display system on which live view 500 is seen. As depicted, augmented reality information 504 is displayed to augment live view 500. The display of augmented reality information 504 is generated in response to processing an image of document 502. The image of document 502 is sent from the mobile display system to a document processor, such as document processor 208 in FIGS. 2-3.

For example, graphical indicator 506 in augmented reality information 504 identifies document 502 as originating from Employment Development Department for the state of California. Graphical indicator 506 also provides link 507 to the website for this government agency. Further, graphical indicator 508 in augmented reality information 504 indicates that document 502 is an agency notice and requests user input as to whether to send the agency notice to the service. In this example, the service is a human resources service for a human resources management company.

As depicted, graphical indicator 510 in augmented reality information 504 highlights rates and indicates that a rate sum of 1.4 percent is identified while the current rate in the database is 2.3 percent. In this example, graphical indicator 510 displays a relation of the human resources information to the document information to augment live view 500. As depicted, the document information is the rate sum while the human resources information is the current rate in the database.

Further, graphical indicator 510 requests user input as to whether to change this rate in the human resources information in the database. Additionally, graphical indicator 512 in augmented reality information 504 requests user input as to whether to apply the notice to a template database.

The illustration of augmented reality information 504 displayed on live view 500 of document 502 is provided as an example of one manner in which augmented reality information 220 can be displayed on live view 214 shown in block form in FIG. 2. This example is not meant to limit the manner in which augmented reality information can be displayed on live views of documents in other illustrative examples. For example, other illustrative examples may display augmented reality information in the form of a video on a live view to provide instructions or selections for user input. In still another example, the augmented reality information can indicate that processing of the document has been completed.

Figure 6:
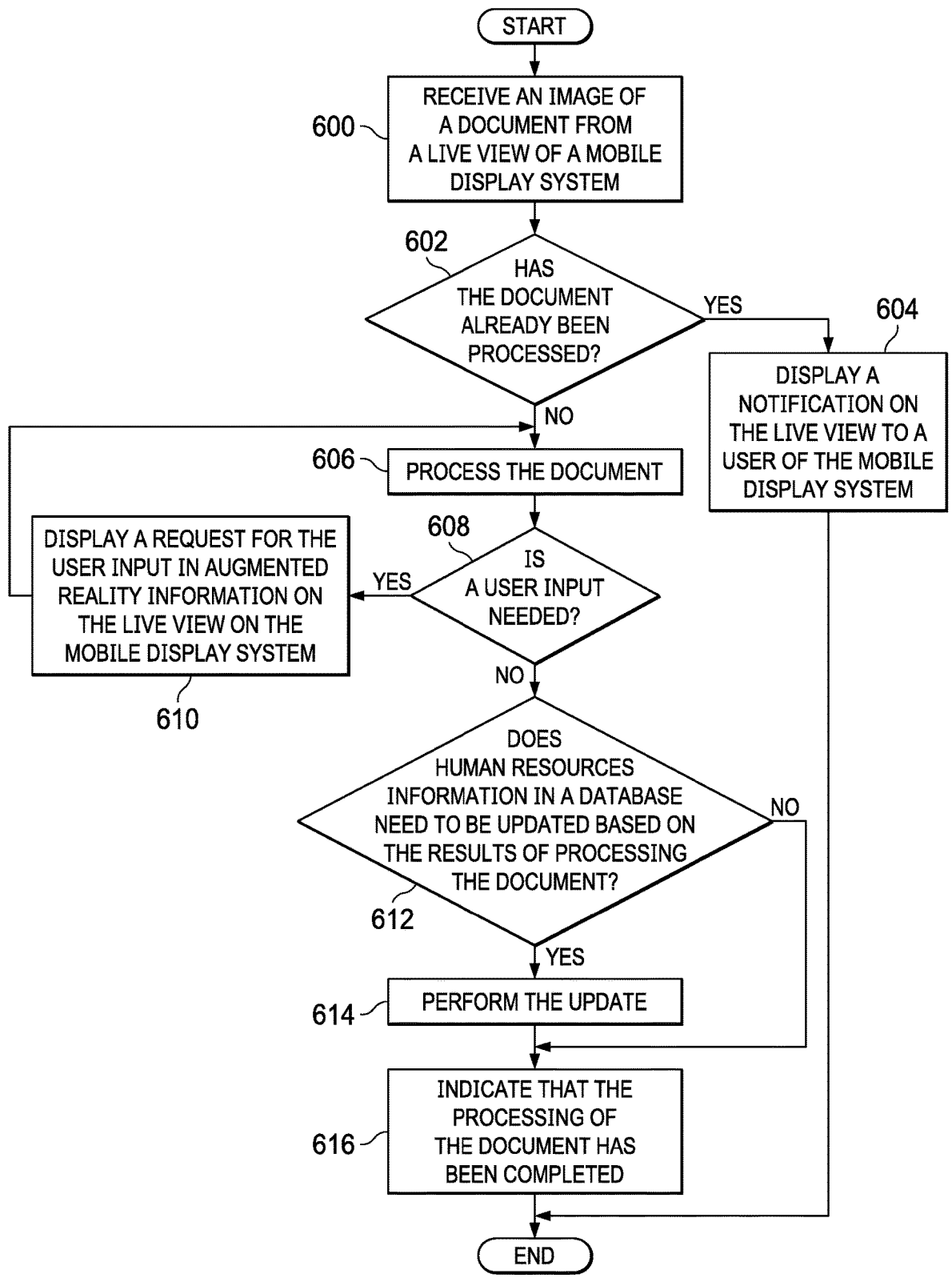
FIG. 6 is a flowchart of a high-level process for processing a document in accordance with an illustrative embodiment.

With reference to FIG. 6, a flowchart of a high-level process for processing a document is depicted in accordance with an illustrative embodiment. The processes in FIG. 6 can be implemented in hardware, software, or both. When implemented in software, the processes can take the form of program code that is run by one of more processor units located in one or more hardware devices in one or more computer systems. For example, these processes can be implemented in document processor 208 running on computer system 210 in FIG. 2.

The process begins by receiving an image of a document from a live view of a mobile display system (step 600). The document can be identified in step 600 in a number of ways. For example, object recognition process can be performed on an image in the live view.

The object recognition process can determine when a document of interest is present in the live view. For example, the document of interest can be a document from a source that is handled by the service. For example, the object recognition process can identify documents from government agencies, companies, or other sources that are handled by the service. Further, the object recognition process can also identify particular types of documents from those sources.

The object recognition process can identify letterheads, document titles, or other information that may be used to determine whether the document in the live view should be processed. In other words, a document in the live view not identified for processing is ignored.

The process determines whether the document has already been processed (step 602). The document can be considered to have already been processed if the document has already been received for processing. For example, the document may have been sent to the service provider. If the document has already been processed, a notification is displayed on the live view to a user of the mobile display system (step 604). The process terminates thereafter. In step 604, the notification is displayed in augmented reality information to augment the live view of the document.

With reference again to step 602, if the document has not already been processed, the process processes the document (step 606). A determination is made as to whether a user input is needed (step 608). If the user input is needed, a request for the user input is displayed in augmented reality information on the live view on the mobile display system (step 610). The process then returns to step 606 to continue processing the document.

With reference again to step at 608, if the user input is not needed, the process determines whether human resources information in a database needs to be updated based on the results of processing the document (step 612). For example, document information may be the same or match the human resources information. The match may occur because of updates made from other sources other than a copy of the document.

If the human resources information needs updating, the process performs the update (step 614). The process then indicates that the processing of the document has been completed (step 616), with the process terminating thereafter. In step 616, this indication can be made through displaying augmented reality information on the live view on the mobile display system.

With reference again to step 612, if the human resources information does not need to be updated, the process proceeds to step 616. This process can be repeated each time an image is received.

Figure 7:
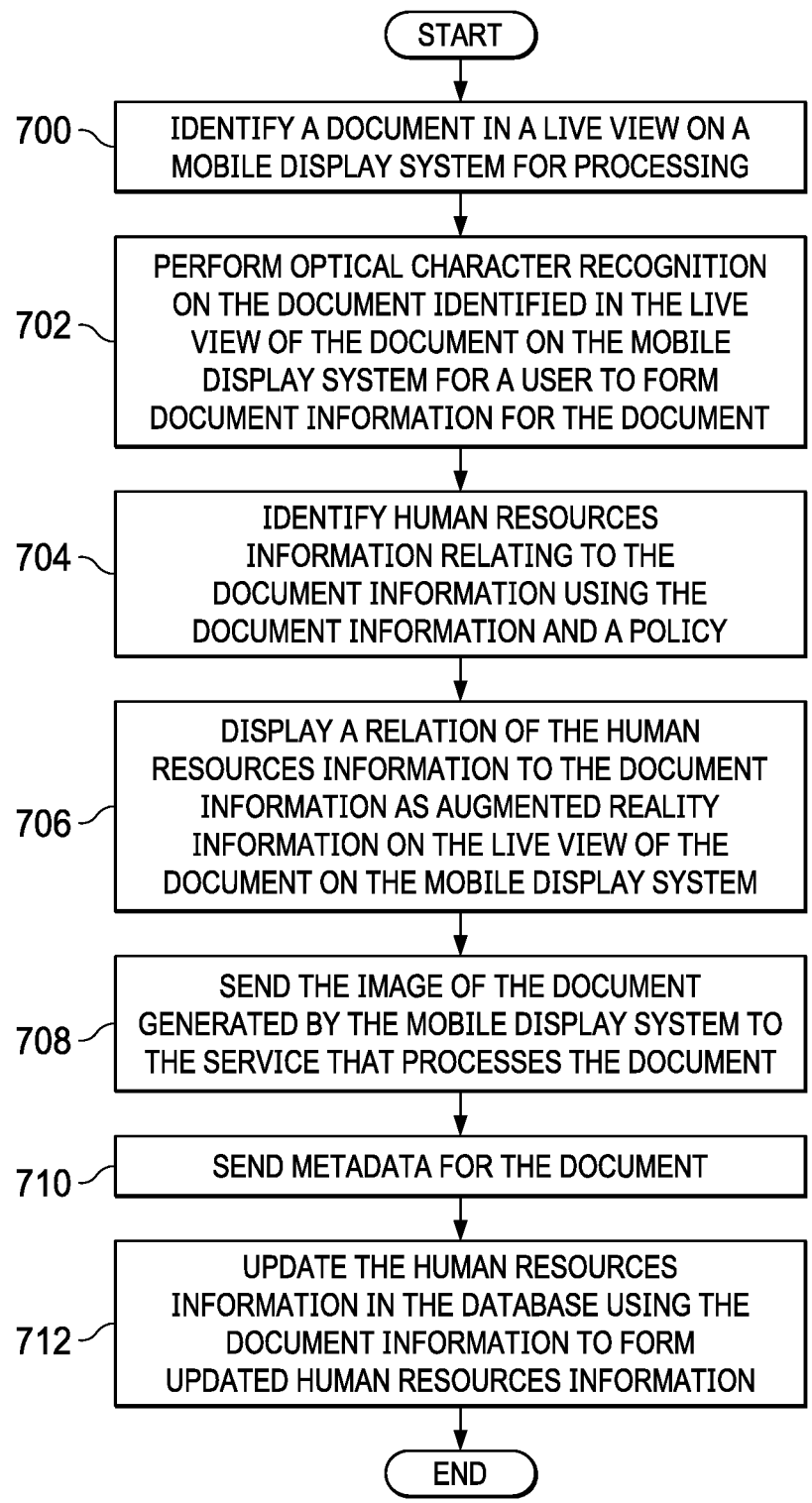
FIG. 7 is a flowchart of a process for processing a document in accordance with an illustrative embodiment.

Turning next to FIG. 7, a flowchart of a process for processing a document is depicted in accordance with an illustrative embodiment. The processes in FIG. 7 can be implemented in hardware, software, or both. When implemented in software, the processes can take the form of program code that is run by one of more processor units located in one or more hardware devices in one or more computer systems. For example, these processes can be implemented in document processor 208 running on computer system 210 in FIG. 2.

The process begins by identifying a document in a live view on a mobile display system for processing (step 700). The process performs optical character recognition on the document identified in the live view of the document on the mobile display system for a user to form document information for the document (step 702).

The process identifies human resources information relating to the document information using the document information and a policy (step 704). The human resources information is stored in a database and the policy comprises one or more rules that defines what human resources information is relevant to the document.

The process displays a relation of the human resources information to the document information as augmented reality information on the live view of the document on the mobile display system (step 706). In step 706, parts of the document containing document information of interest can be highlighted.

The process sends the image of the document generated by the mobile display system to the service that processes the document (step 708). The image is sent over a network that includes at least one of wireless and wired connections. Next, the process sends metadata for the document to the service that processes the document (step 710).

The process updates the human resources information in the database using the document information to form updated human resources information (step 712). The process terminates thereafter.

Figure 8:
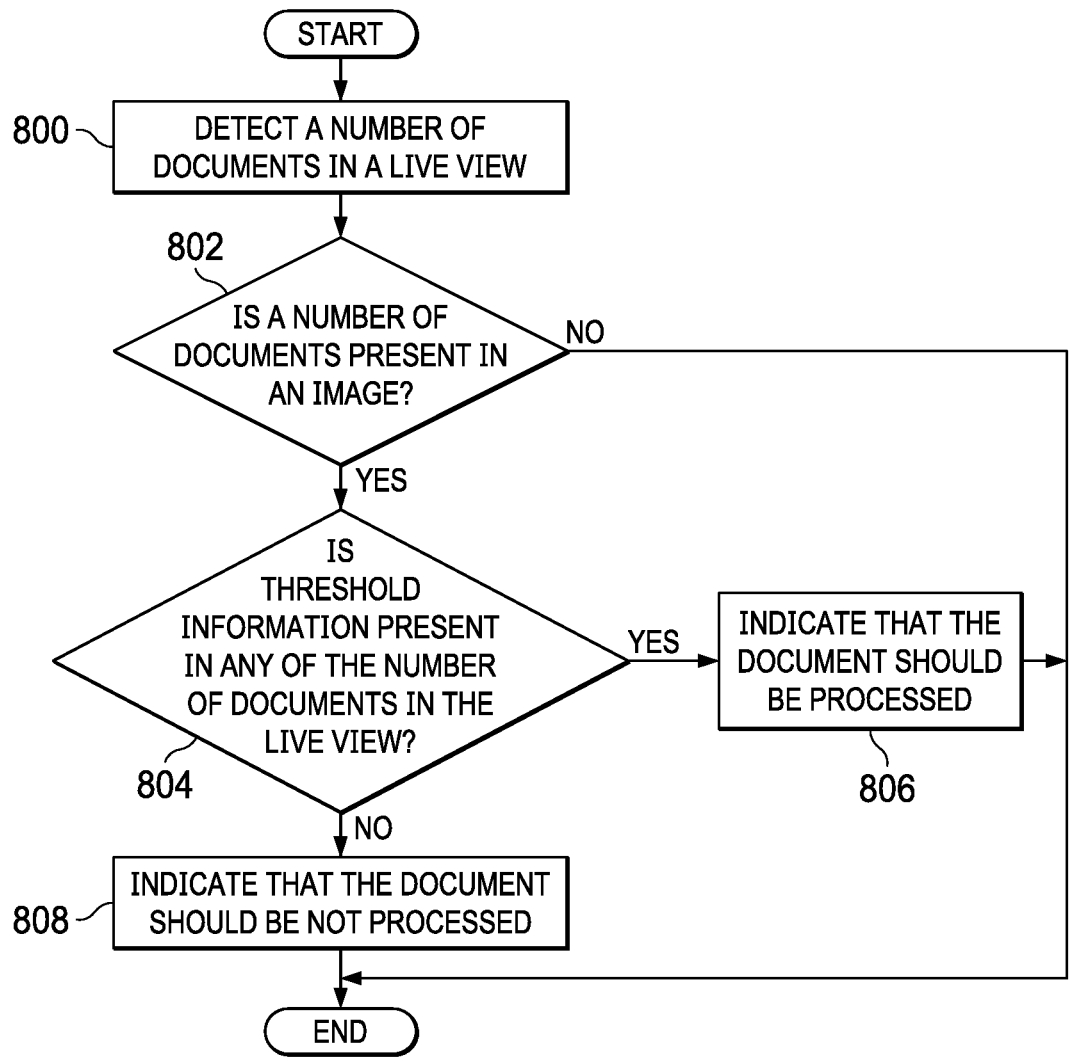
FIG. 8 is a flowchart of a process for identifying a document in a live view for processing in accordance with illustrative embodiment.

Turning to FIG. 8, a flowchart of a process for identifying a document in a live view for processing is depicted in accordance with an illustrative embodiment. The process illustrated in FIG. 8 is an example of one implementation for step 700 in FIG. 7.

The process begins by detecting a number of documents in a live view (step 800). This process is performed using one or more images of the live view.

The process determines whether a number of documents is present in an image (step 802). The determination in step 802 can be performed in a number of different ways. For example, object character recognition can be used to identify the presence of the number of documents, and optical character recognition processes can be used to generate text for analysis to determine whether the number of documents is present in the image.

If the number of documents is present in the image, a determination is made as to whether threshold information is present in any of the number of documents in the live view (step 804). The presence of the threshold information in a document in the number of documents indicates that the document is handled by a service. The threshold information may be selected from at least one of a keyword, a logo, or other suitable information in the image of the number of documents. The keywords, logos, or other information can be used to determine whether the document is one processed by the service. When this information is present, the document is considered to have the threshold information.

If the threshold information is present in the number of documents, an indication is made that the document should be processed (step 806), with the process terminating thereafter. Otherwise, an indication that the document should not be processed is made (step 808). The process also terminates thereafter. With reference again to step 802, if the number of documents is not present in the image, the process also terminates.

Figure 9:
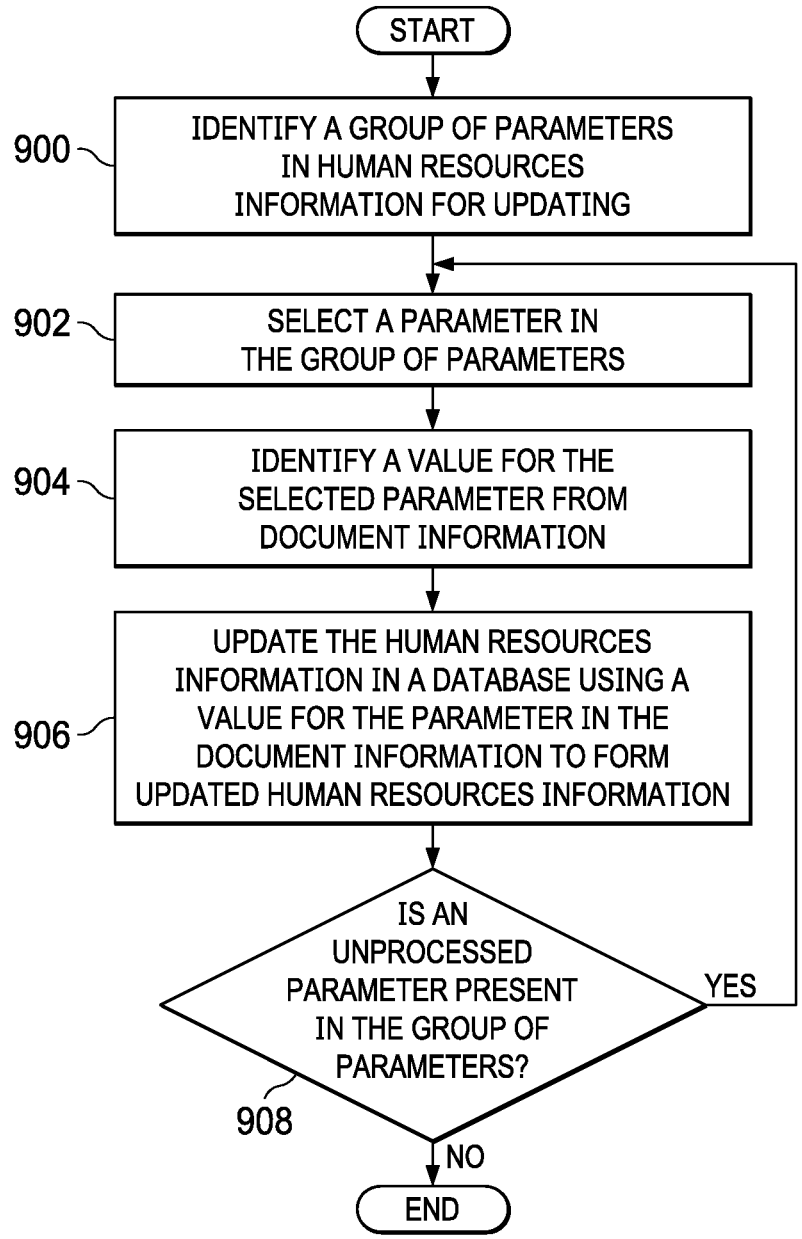
FIG. 9 is a flowchart of a process for updating human resources information in accordance with in illustrative embodiment.

With reference next to FIG. 9, a flowchart of a process for updating human resources information is depicted in accordance with an illustrative embodiment. The process illustrated in FIG. 9 is an example of one implementation for step 708 in FIG. 7.

The process identifies a group of parameters in human resources information for updating (step 900). The process selects a parameter in the group of parameters (step 902). The parameter is a parameter in the human resources information in a database. For example, the parameter can be selected from a group comprising a state tax rate, a federal tax rate, an amount of wages for a garnishment, a name, a social security number, a residence address, a phone number, an amount of pay, an amount of federal tax withholding, a number of exemptions for tax withholding, a marital status, and other parameters present in the human resources information.

The process identifies a value for the selected parameter from document information (step 904). The process updates the human resources information in a database using a value for the parameter in the document information to form updated human resources information (step 906).

A determination is made as to whether an unprocessed parameter is present in the group of parameters (step 908). If an unprocessed parameter is present, the process returns to step 902. Otherwise, the process terminates.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 10:
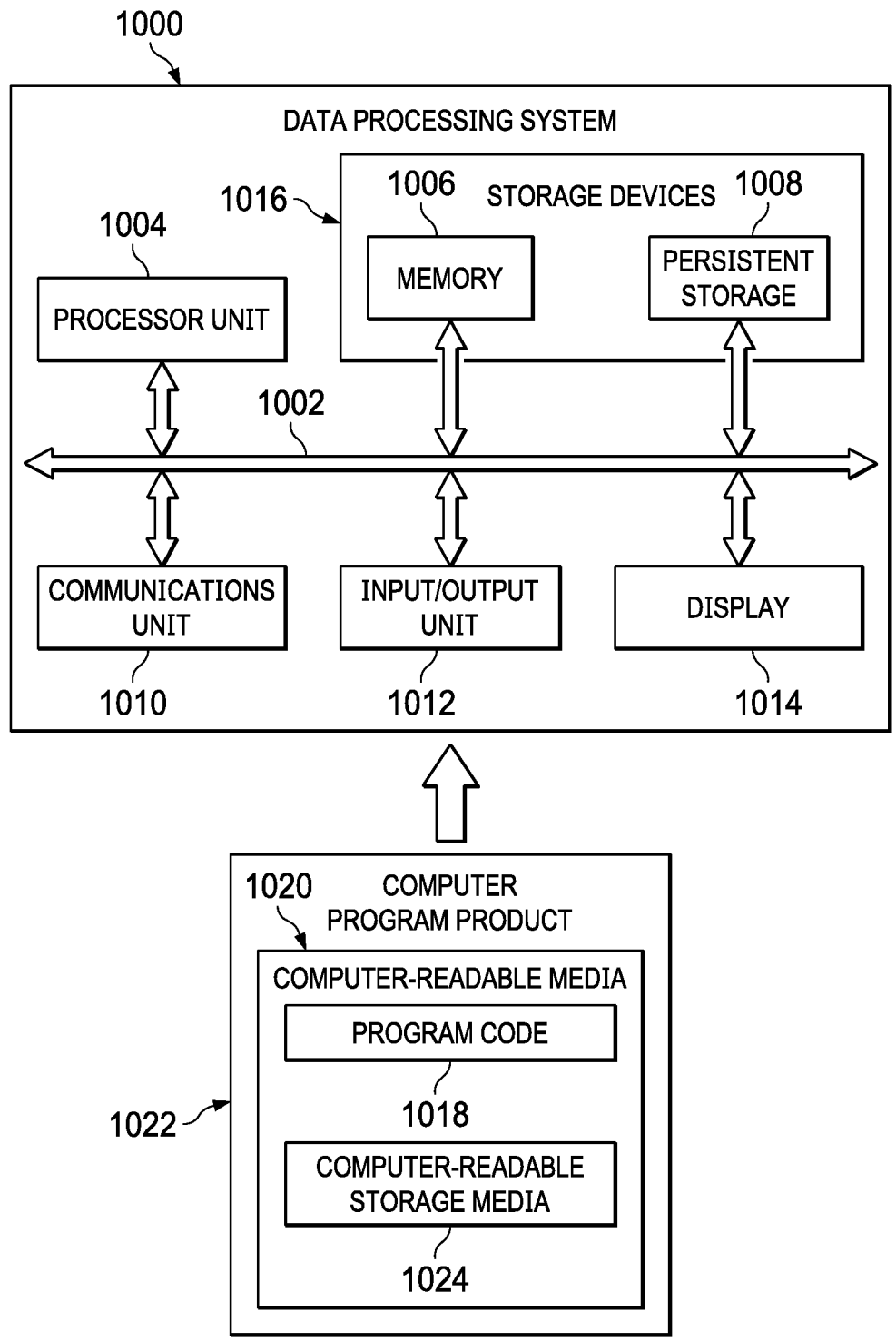
FIG. 10 is a block diagram of a data processing system in accordance with an illustrative embodiment.

Turning now to FIG. 10, a block diagram of a data processing system is depicted in accordance with an illustrative embodiment. Data processing system 1000 may be used to implement server computer 104 in FIG. 1, server computer 106 in FIG. 1, client devices 110 in FIG. 1, computer system 210 in FIG. 2, mobile display system 212 in FIG. 2, and smart glasses 302 in FIG. 3. In this illustrative example, data processing system 1000 includes communications framework 1002, which provides communications between processor unit 1004, memory 1006, persistent storage 1008, communications unit 1010, input/output unit 1012, and display 1014. In this example, communications framework 1002 may take the form of a bus system.

Processor unit 1004 serves to execute instructions for software that may be loaded into memory 1006. Processor unit 1004 may be a number of processors, a multi-processor core, or some other type of processor, depending on the particular implementation.

Memory 1006 and persistent storage 1008 are examples of storage devices 1016. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1016 may also be referred to as computer-readable storage devices in these illustrative examples. Memory 1006, in these examples, may be, for example, a random-access memory or any other suitable volatile or non-volatile storage device. Persistent storage 1008 may take various forms, depending on the particular implementation.

For example, persistent storage 1008 may contain one or more components or devices. For example, persistent storage 1008 may be a hard drive, a solid-state drive (SSD), a flash memory, a rewritable optical disk, a rewritable magnetic tape, or some combination of the above. The media used by persistent storage 1008 also may be removable. For example, a removable hard drive may be used for persistent storage 1008.

Communications unit 1010, in these illustrative examples, provides for communications with other data processing systems or devices. In these illustrative examples, communications unit 1010 is a network interface card.

Input/output unit 1012 allows for input and output of data with other devices that may be connected to data processing system 1000. For example, input/output unit 1012 may provide a connection for user input through at least one of a keyboard, a mouse, or some other suitable input device. Further, input/output unit 1012 may send output to a printer. Display 1014 provides a mechanism to display information to a user.

Instructions for at least one of the operating system, applications, or programs may be located in storage devices 1016, which are in communication with processor unit 1004 through communications framework 1002. The processes of the different embodiments may be performed by processor unit 1004 using computer-implemented instructions, which may be located in a memory, such as memory 1006.

These instructions are referred to as program code, computer usable program code, or computer-readable program code that may be read and executed by a processor in processor unit 1004. The program code in the different embodiments may be embodied on different physical or computer-readable storage media, such as memory 1006 or persistent storage 1008.

Program code 1018 is located in a functional form on computer-readable media 1020 that is selectively removable and may be loaded onto or transferred to data processing system 1000 for execution by processor unit 1004. Program code 1018 and computer-readable media 1020 form computer program product 1022 in these illustrative examples. In the illustrative example, computer-readable media 1020 is computer-readable storage media 1024.

In these illustrative examples, computer-readable storage media 1024 is a physical or tangible storage device used to store program code 1018 rather than a medium that propagates or transmits program code 1018.

Alternatively, program code 1018 may be transferred to data processing system 1000 using a computer-readable signal media. The computer-readable signal media may be, for example, a propagated data signal containing program code 1018. For example, the computer-readable signal media may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1000 are not meant to provide architectural limitations to the manner in which different embodiments may be implemented. The different illustrative embodiments may be implemented in a data processing system including components in addition to or in place of those illustrated for data processing system 1000. Other components shown in FIG. 10 can be varied from the illustrative examples shown. The different embodiments may be implemented using any hardware device or system capable of running program code 1018.

Thus, the illustrative examples provide a method, an apparatus, a system, and a computer program product for document processing. In one illustrative example, a computer system identifies a document in a live view on a mobile display system for processing. The document contains changes that may affect human resources information managed by a service provider through a service. Based on analyzing the document, human resources information may need to be changed to maintain accuracy of the human resources information.

The computer system performs optical character recognition on the document identified in the live view of the document on the mobile display system for a human operator to form document information for the document. The computer system identifies human resources information relating to the document information using the document information and a policy. The human resources information is stored in a database, wherein the policy defines the human resources information relevant to the document. The computer system displays a relation of the human resources information to the document information in augmented reality information on the live view of the document on the mobile display system to augment the live view. If the document has already been processed, the computer system updates the human resources information in the database using the document information to form updated human resources information.

In one illustrative example, one or more technical solutions are present that overcome a technical problem with the time and expense involved with submitting documents to a human resources management company for processing. As a result, one or more technical solutions may provide a technical effect of at least one of increasing speed, reducing cost, or reducing errors in processing of documents. One or more technical solutions are presented in which a user of a mobile display system views one or more of the documents in the live view on a mobile display system. A document processor processes the documents with respect to a service provider.

In one or more technical solutions, the document processor displays augmented reality information to notify the user of processing of a document, request user input from the user, or some combination thereof. The notification can include indicating whether the document has already been processed or that the processing of the document has been completed.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for processing a document, the method comprising:
    a mobile display system generating an image of a live view of the document;
    a computer system communicating with the mobile display system and a service outside of the computer system communicating with human resources information in a database outside of the computer system;
    the computer system performing the following operations:
        identifying the document in the live view on the mobile display system for processing via:
            performing optical character recognition on the document identified in the live view of the document on the mobile display system and;
            forming document information comprising metadata from the document while the document is in the live view on the mobile display system;
        determining whether the document:
            contains document information exceeding a threshold indicating a type of document handled by the service; and
            has been previously received by the service;
        indicating, responsive to determining that the document information falls below the threshold for handling by the service, that the document should not be processed;
        responsive to the service receiving the document for a first time and being the type of document handled by the service, applying a rule in a policy for identifying, using the service using the document information, the human resources information in the database outside of the computer system relating to the document information, wherein the policy defines the human resources information relating to the document;
        displaying, in augmented reality information on the live view of the document on the mobile display system, a comparison between the human resources information in the database outside of the computer system relating to the document and the document information;
        responsive to a lack of any discrepancy between the document information and the human resources information in the database outside of the computer system relating to the document, indicating the document as processed;
        responsive to a discrepancy between the document information and the human resources information in the database outside of the computer system relating to the document, sending an update query to the service; and
        updating the human resources information in the database outside of the computer system relating to the document using the document information and forming updated human resources information.

2. The method of claim 1 further comprising:
    deriving the metadata for the document from the mobile display system being logged into the service; and
    performing, by the computer system, a number of human resource operations using the service and the updated human resources information.

3. The method of claim 1, wherein the document information includes a value for a parameter in the human resources information relating to the document, and wherein the updating step comprises updating, by the computer system, the parameter in the human resources information in the database via the update query including a value for the parameter in the document information and forming the updated human resources information.

4. The method of claim 3, wherein the parameter is selected from a group comprising a state tax rate, a federal tax rate, an amount of wages for a garnishment, a name, a social security number, a residence address, a phone number, an amount of pay, an amount of federal tax withholding, a number of exemptions for tax withholding, and a marital status.

5. The method of claim 1 further comprising:
    displaying, by the computer system, a request for a user input on how to handle the document information in the augmented reality information displayed on the live view.

6. The method of claim 1, wherein the updating step is performed in response to a user input, and wherein the rule specifies that a search query sent to the database should include at least one parameter.

7. The method of claim 1, wherein the updating step is performed automatically without a user input.

8. The method of claim 1 further comprising:
    sending, by the computer system in response to determining that the document has not already been processed by the service processing the document, the image of the document generated by the mobile display system to the service that processes the document over a network, wherein the service is selected from one of a human resources service, a payroll service, a compliance service, a tax compliance service, a benefits service, and a retirement planning service.

9. The method of claim 8 further comprising:
sending, by the computer system, the metadata for the document with the image of the document to the service over the network.

10. The method of claim 2, wherein the number of human resource operations is selected from at least one of withholding federal taxes from a payroll, withholding state taxes from the payroll, updating tax withholdings, garnishing wages, initiating a garnishment, and withholding funds for a retirement fund.

11. The method of claim 1, wherein the document is selected from a group of document types comprising an agency notice, a tax rate change notice, a state tax rate change notice, a sales tax rate change notice, a state income tax rate change notice, a wage and garnishment letter, a power of attorney, a third-party administrator form, and a reporting agent form.

12. The method of claim 1, wherein the mobile display system is selected from one of a head-mounted display, a mobile phone, a tablet computer, smart glasses, and wearable computer glasses.

13. A method for processing a document, the method comprising a computer system:
generating, on a mobile display system, an image of a live view of the document;
communicating with the mobile display system and a service outside of the computer system communicating with human resources information in a database outside of the computer system;
identifying the document in the live view on the mobile display system via;
performing optical character recognition on the document identified in the live view of the document on the mobile display system for a user; and
forming document information for the document comprising metadata from the document while the document is in the live view on the mobile display system;
determining, whether the document:
contains document information exceeding a threshold indicating a type of document handled by the service; and
has been previously received by the service;
indicating, responsive to determining the document falls below the threshold for handling by the service, that the document should not be processed;
responsive to the service receiving the document for a first time and being the type of document handled by the service, applying a rule in a policy for identifying, using the service using the document information, a parameter in the human resources information in the database outside of the computer system for the document information wherein the human resources information is used in a number of human resource operations, and wherein the policy defines the human resources information relating to the document;
displaying, in augmented reality information on the live view of the document on the mobile display system, a comparison between the human resources information relating to the document and the document information;
responsive to a discrepancy between the document information and the human resources information in the database outside of the computer system relating to the document, sending an update query to the service; and updating the human resources information in the database outside of the computer system relating to the document using the document information and forming updated human resources information.

14. The method of claim 13 further comprising:
responsive to a lack of any discrepancy between the document information and the human resources information in the database outside of the computer system relating to the document, indicating the document as processed; and
sending, by the computer system in response to determining that the document has not already been processed by the service that processes the document, the image of the document generated by the mobile display system to the service that processes the document over a network.

15. The method of claim 14 further comprising:
sending, by the computer system, the metadata for the document with the image of the document to the service over the network.

16. The method of claim 14, wherein the service is selected from one of a human resources service, a payroll service, a compliance service, a tax compliance service, a benefits service, and a retirement planning service.

17. The method of claim 13, wherein displaying, by the computer system, the comparison comprises:
highlighting parts of the document containing the document information related to the human resources information.

18. The method of claim 13, wherein displaying, by the computer system, the comparison comprises:
displaying instructions in the augmented reality information on the document in the live view.

19. The method of claim 13, wherein identifying, by the computer system, the document in the live view on the mobile display system comprises:
detecting a number of documents in the live view; and
determining whether threshold information is present in any of the number of documents in the live view, wherein a presence of the threshold information in the document in the number of documents indicates that the document is handled by the service, and wherein the threshold information comprises at least one of a keyword and a logo.

20. The method of claim 13, wherein the policy is a compliance policy and associated information is compliance information that is used in the number of human resource operations to meet a number of government compliance regulations.

21. The method of claim 13, wherein the number of human resource operations is selected from at least one of withholding federal taxes from a payroll, withholding state taxes from the payroll, updating tax withholdings, garnishing wages, initiating a garnishment, and withholding funds for a retirement fund.

22. The method of claim 13, wherein the document is selected from a group of document types comprising an agency notice, a tax rate change notice, a state tax rate change notice, a sales tax rate change notice, a state income tax rate change notice, a wage and garnishment letter, a power of attorney, a third-party administrator form, and a reporting agent form.

23. The method of claim 13, wherein the mobile display system is selected from one of a head-mounted display, a mobile phone, a tablet computer, smart glasses, and wearable computer glasses.

24. A document processing system that comprises:
  a mobile display system configured to generate an image of a live view of a document;
  a computer system; and
  a document processor configured to run on the computer system and:
    communicate with the mobile display system and a service outside of the computer system configured to communicate with human resources information in a database outside of the computer system;
    identify the document in the live view on the mobile display system;
    perform optical character recognition on the document identified in the live view of the document on the mobile display system and form document information that comprises metadata from the document while the document is in the live view on the mobile display system;
    determine, based on a search query sent to the service, whether the document:
      contains document information that exceeds a threshold that indicates a type of document handled by the service; and
      has been previously received by the service;
    indicate, responsive to a determination that the document falls below the threshold for handling by the service, that the document should not be processed;
    responsive to a first reception of the document by the service, apply a rule in a policy that identifies, based upon the document information received by the service, human resources information relevant to the document wherein the policy defines the human resources information relevant to the document;
    display in augmented reality information on the live view of the document on the mobile display system, a comparison between the human resources information relevant to the document and the document information;
    responsive to a lack of any discrepancy between the document information and the human resources information in the database outside of the computer system relevant to the document, indicate the document as processed;
    responsive to a discrepancy between the document information and the human resources information in the database that relates to the document, send an update query to the service; and
    update, based upon the document information, the human resources information in the database that relates to the document to form updated human resources information.

25. The document processing system of claim 24, further comprising the document processor configured to:
  derive the metadata for the document based upon the mobile display system being logged into the service; and
  perform a number of human resource operations based upon the service and the updated human resources information.

26. The document processing system of claim 24, wherein the document information includes a value for a parameter in the human resources information, the document processor is configured to update the parameter in the human resources information in the database based upon the update query comprising the value for the parameter in the document information to form the updated human resources information.

27. The document processing system of claim 26, wherein the parameter is selected from a group comprising a state tax rate, a federal tax rate, an amount of wages for a garnishment, a name, a social security number, a residence address, a phone number, an amount of pay, an amount of federal tax withholding, a number of exemptions for tax withholding, and a marital status.

28. The document processing system of claim 24, wherein the document processor displays a request for a user input on how to handle the document information as augmented reality information displayed on the live view.

29. The document processing system of claim 24, further comprising the document processor configured to update the human resources information in the database based upon the document information in response to a user input and form the updated human resources information, and wherein the policy specifies that the search query sent to the database should include at least one parameter.

30. The document processing system of claim 24, further comprising the document processor configured to update the human resources information in the database based upon the document information automatically without a user input to form the updated human resources information.

31. The document processing system of claim 24, wherein the document processor sends, responsive to a determination that the document has not already been processed by the service, the image of the document generated by the mobile display system to the service, wherein the service is selected from one of: a human resources service, a payroll service, a compliance service, a tax compliance service, a benefits service, and a retirement planning service.

32. The document processing system of claim 31, wherein the document processor sends the metadata for the document with the image of the document to the service over a network.

33. The document processing system of claim 25, wherein the number of human resource operations is selected from at least one of withholding federal taxes from a payroll, withholding state taxes from the payroll, updating tax withholdings, garnishing wages, initiating a garnishment, withholding funds for a retirement fund, and processing the payroll.

34. The document processing system of claim 24, wherein the document is selected from a group of document types comprising an agency notice, a tax rate change notice, a state tax rate change notice, a sales tax rate change notice, a state income tax rate change notice, a wage and garnishment letter, a power of attorney, a third-party administrator form, and a reporting agent form.

35. The document processing system of claim 24, wherein the mobile display system is selected from one of a head-mounted display, a mobile phone, a tablet computer, smart glasses, and wearable computer glasses.

36. A document processing system that comprises:
  a mobile display system configured to generate an image of a live view of a document;
  a computer system; and
  a document processor configured to run on the computer system and:
    communicate with the mobile display system and a service outside of the computer system configured to communicate with human resources information in a database outside of the computer system;
    identify the document in the live view on the mobile display system;
    perform optical character recognition on the document identified in the live view of the document on the mobile display system and form document information for the document that comprises metadata from the document while the document is in the live view on the mobile display system;

determine, based on a search query sent to the service, whether the document:
  contains document information that exceeds a threshold that indicates a type of document handled by the; and
  has been previously received by the service;

indicate, responsive to a determination that the document falls below the threshold for handling by the service, that the document should not be processed;

responsive to a first reception of the document by the service, apply a rule in a policy that identifies, based upon the document information received by the service, a parameter in the human resources information in the database outside of the computer system for the document information wherein the human resources information is used in a number of human resource operations, and wherein the policy defines the human resources information relevant to the document;

display in augmented reality information on the live view of the document on the mobile display system, a comparison between the human resources information relevant to the document and the document information;

responsive to a discrepancy between the document information and the human resources information in the database that relates to the document, send an update query to the service; and update, based upon the document information and form updated human resources information, the human resources information in the database that relates to the document.

37. The document processing system of claim 36, wherein the document processor:
  responsive to a lack of any discrepancy between the document information and the human resources information in the database outside of the computer system relevant to the document, indicates the document as processed; and
  sends the image of the document generated by the mobile display system to the service in response to a determination that the document has not already been processed by the service.

38. The document processing system of claim 37, wherein the document processor sends the metadata for the document with the image of the document to the service over a network.

39. The document processing system of claim 37, wherein the service is selected from one of a human resources service, a payroll service, a compliance service, a tax compliance service, a benefits service, and a retirement planning service.

40. The document processing system of claim 36, further comprising the document processor configured to highlight parts of the document relevant to the human resources information.

41. The document processing system of claim 36, wherein the document processor displays instructions as augmented reality information on the document in the live view associated with the instructions.

42. The document processing system of claim 36, further comprising:
  the document processor configured to detect a number of documents in the live view; and
  determine whether threshold information is present in any of the number of documents in the live view, wherein a presence of the threshold information in the document in the number of documents indicates that the document is handled by the service, and wherein the threshold information comprises at least one of a keyword and a logo.

43. The document processing system of claim 36, wherein the policy is a compliance policy and associated information is compliance information that is used in the number of human resource operations to meet a number of government compliance regulations.

44. The document processing system of claim 36, wherein the number of human resource operations is selected from at least one of withholding federal taxes from a payroll, withholding state taxes from the payroll, updating tax withholdings, garnishing wages, initiating a garnishment, and withholding funds for a retirement fund.

45. The document processing system of claim 36, wherein the document is selected from a group of document types comprising an agency notice, a tax rate change notice, a state tax rate change notice, a sales tax rate change notice, a state income tax rate change notice, a wage and garnishment letter, a power of attorney, a third-party administrator form, and a reporting agent form.

46. The document processing system of claim 36, wherein the mobile display system is selected from one of a head-mounted display, a mobile phone, a tablet computer, smart glasses, and wearable computer glasses.

47. A computer system that comprises a computer program product that comprises:
  a computer-readable storage media;
  first program code, stored on the computer-readable storage media, configured to communicate with:
    a mobile display system, configured to generate an image of a live view of a document in the mobile display system; and
    a service outside of the computer system configured to communicate with human resources information stored in a database outside of the computer system and the document in the live view on the mobile display system;
  second program code, stored on the computer-readable storage media, configured to perform optical character recognition on the document identified in the live view of the document on the mobile display system and form document information for the document that comprises metadata from the document while the document is in the live view on the mobile display system;
  third program code, stored on the computer-readable storage media, configured to:
    determine, based on a search query sent to the service, whether the document:
      contains document information that exceeds a threshold that indicates a type of document handled by the service; and
      has been previously received by the service;
    indicate, responsive to a determination that the document falls below the threshold for handling by the service, that the document should not be processed;
    responsive to a first reception of the document by the service, apply a rule in a policy that identifies, based upon the document information received by the service, human resources information in the database relevant to the document information wherein the policy defines the human resources information relevant to the document;

fourth program code, stored on the computer-readable storage media, configured to:

display in augmented reality information on the live view of the document on the mobile display system, a relation between the human resources information in the database outside of the computer system relevant to the document and the document information;

responsive to a lack of any discrepancy between the document information and the human resources information in the database outside of the computer system relating to the document, indicate the document as processed; and responsive to a discrepancy between the document information and the human resources information relating to the document, send an update query to the service; and fifth program code, stored on the computer-readable storage media, configured to update the human resources information in the database based on the document information and form updated human resources information.

48. A computer system that comprises a computer program product that comprises:

a computer-readable storage media;

first program code, stored on the computer-readable storage media, configured to communicate with:

a mobile display system, configured to generate an image of a live view of a document in the mobile display system; and a service configured to store:

human resources information in a database outside of the computer system; and the document in the live view on the mobile display system;

second program code, stored on the computer-readable storage media, configured to:

perform optical character recognition on the document identified in the live view of the document on the mobile display system; and form document information for the document that comprises metadata from the document while the document is in the live view on the mobile display system;

third program code, stored on the computer-readable storage media, configured to:

determine, based on a search query sent to the service, whether the document:

contains document information that exceeds a threshold that indicates a type of document handled by the service; and has been previously received by the service;

indicate, responsive to a determination that the document falls below the threshold for handling by the service, that the document should not be processed;

responsive to a first reception of the document by the service, apply a rule in a policy that identifies, based upon the document information received by the service, a parameter in the human resources information in the database outside of the computer system for the document information, wherein the human resources information is used in a number of human resource operations, and wherein the policy defines the human resources information relevant to the document; and fourth program code, stored on the computer-readable storage media, configured to:

display in augmented reality information on the live view of the document on the mobile display system, a comparison between the human resources information in the database outside of the computer system and the document information; and responsive to a discrepancy between the document information and the human resources information relevant to the document, send an update query to the service and update the human resources information in the database outside of the computer system relevant to the document using the document information and forming updated human resources information.

* * * * *